April 13, 1937.    G. O. HARRISON    2,077,321
DIRECT TRIP DEVICE
Filed Feb. 27, 1936    2 Sheets-Sheet 1

WITNESSES:
Michael Stark
Wm. C. Groome

INVENTOR
George O. Harrison.
BY
ATTORNEY

April 13, 1937. G. O. HARRISON 2,077,321
DIRECT TRIP DEVICE
Filed Feb. 27, 1936 2 Sheets-Sheet 2
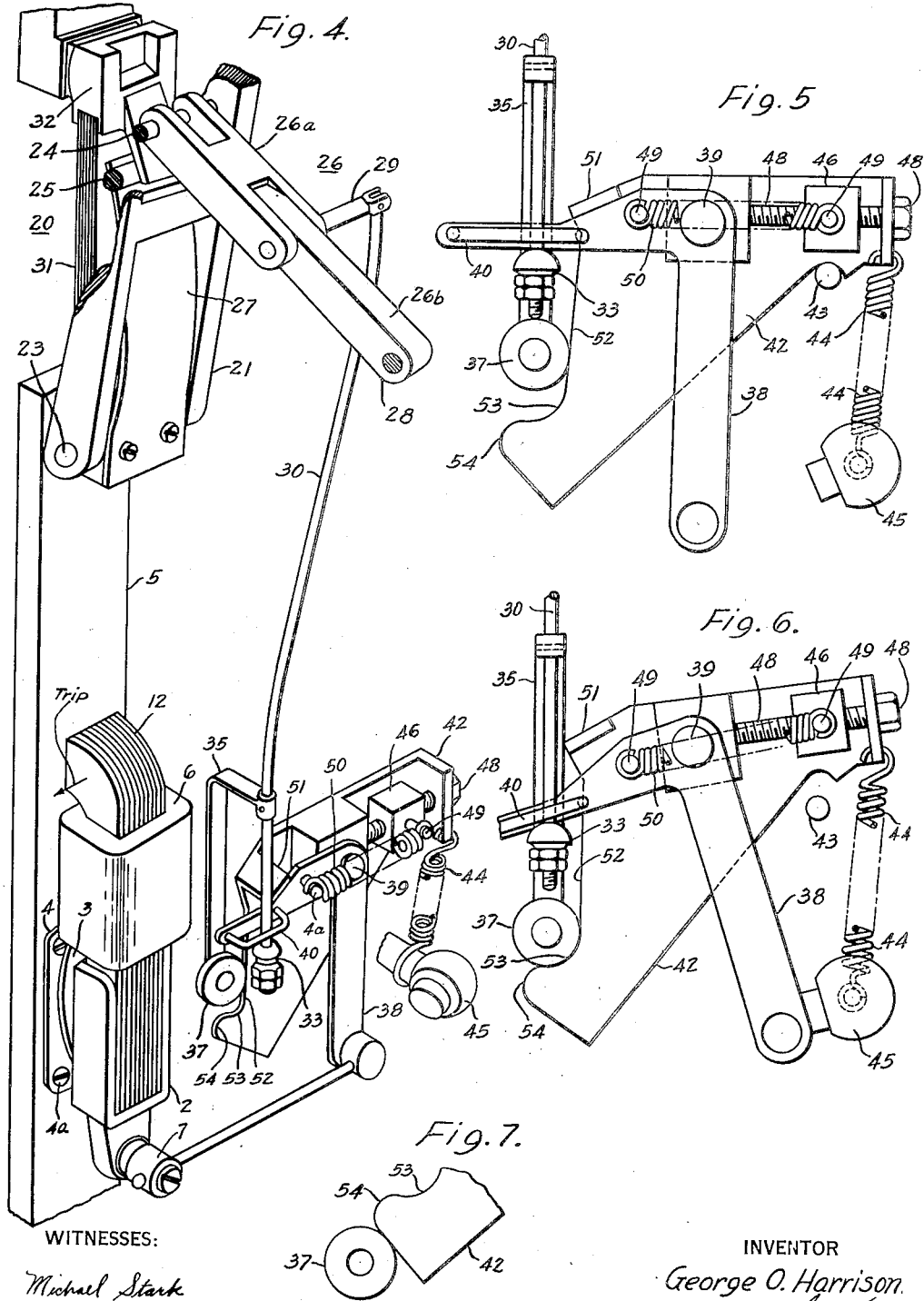

Patented Apr. 13, 1937

2,077,321

UNITED STATES PATENT OFFICE 2,077,321

DIRECT-TRIP DEVICE

George O. Harrison, Wilkinsburg, Pa., assignor to Westinghouse Electric & Manufacturing Company, East Pittsburgh, Pa., a corporation of Pennsylvania Application February 27, 1936, Serial No. 66,016

16 Claims. (Cl. 200—89)

My invention relates to direct trip devices for circuit breakers and particularly to such devices which respond to a second degree variable such as power flow, in circuits carrying comparatively heavy currents at low voltages. Although the invention in its broader aspects is applicable to direct-current as well as alternating-current apparatus, it is particularly suitable for use in alternating-current systems of distribution of the net-work type. In such systems, a network of low-voltage distribution mains is supplied by means of step-down transformers from a plurality of feeders, and automatic circuit breakers, known as network protectors, are provided in the secondary leads of the transformers for controlling the connection of the feeders to the networks.

The network protectors are provided with individual fault-responsive devices, in most cases polyphase power-directional relays, which serve to open the protector in the event of a fault on the associated feeder, but permit the protector to remain closed in the event of network faults so that the latter may be burned off.

The power-directional network relays used for such applications are designed to control the opening of the network protector in accordance with reverse power flow and to control the closure of the protector in accordance with the relative magnitudes and phase relationship of feeder and network voltages. This rather complicated function requires a large number of electrical connections, an elaborate relay design and the use of various auxiliaries such as phasing impedances and, in some instances, separate phasing relays. The need for a simple and reliable control system for network protectors has long been felt in the art, and a number of simplifying expedients have been proposed.

Recent developments in the art have provided a number of simple and satisfactory expedients for controlling the closing or phasing function of the network protectors, and it is an object of the present invention to provide a satisfactory direct-trip device for general application with such simplified closing apparatus. As examples of the closing systems to which the present invention is applicable may be mentioned the systems disclosed in the copending applications of C. T. Altfather, Serial No. 743,865, filed Sept. 13, 1934; and the joint application of J. S. Parsons and G. O. Harrison, Serial No. 726,576, filed May 19, 1934; and in the U. S. Patents No. 2,018,225 to J. S. Parsons issued Oct. 22, 1935; No. 2,018,226 to J. S. Parsons and R. E. Powers issued Oct. 22, 1935, and No. 2,044,148 to M. A. Bostwick, issued June 16, 1936, all assigned to the Westinghouse Electric & Manufacturing Company.

A further object of my invention is to provide a direct-trip device of novel form such that a single design may be used without substantial change over a wide range of protector ratings.

Another object of my invention is to provide a novel direct-trip device of simple design which will develop a torque dependent upon the product of current, voltage and the cosine of the phase angle between these quantities.

A further object of my invention is to provide a direct-trip device which will require a minimum number of electrical connections and weight of material, and which will operate with low electrical losses.

Other objects of my invention will become evident from the following detailed description taken in conjunction with the accompanying drawings, in which, Figure 1 is a view in section taken on the line I—I of Fig. 2.

Fig. 4 is a diagrammatic view in perspective showing an application of the direct-trip element of Fig. 2 to the control of the main latch of a circuit breaker, parts being shown broken and in section, and Figs. 5, 6 and 7 are fragmentary elevational views illustrating the sequence of operations of the adjusting and resetting mechanism of Fig. 4.

Figure 1:
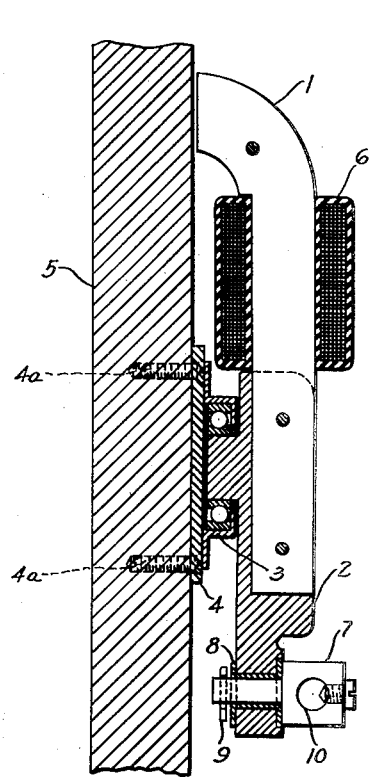
Figure 2:
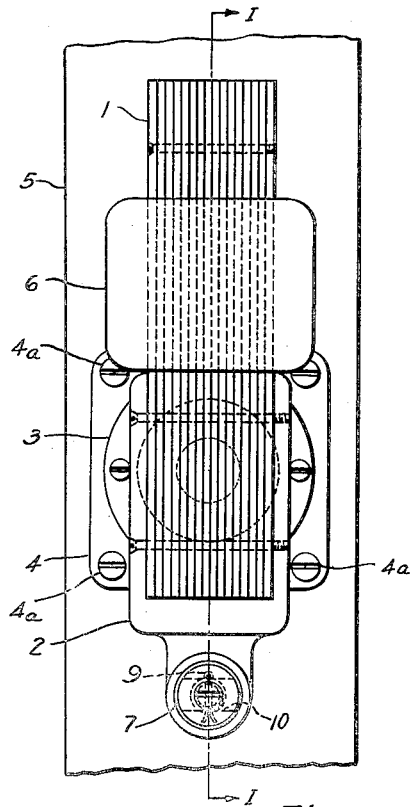
Fig. 2 is a front elevational view of a direct-trip element of my invention mounted upon a vertical bus bar of a network protector, as viewed from the front of the protector casing (not shown).

Referring to Figs. 1 and 2 in detail, a laminated iron core 1, of substantially bar form, is bolted in a rotatable frame 2 which is secured by a main bearing 3 to a plate 4. The plate 4 is fastened by machine screws 4a, or other suitable fastening members, to the bus bar 5. It will be understood that the bus bar 5 is a heavy-current conductor of copper or aluminum, which, in network applications, is commonly rectangular in section and mounted vertically in the protector housing (not shown).

A potential coil 6 is mounted on the core 1 for producing a flux proportional to line voltage. The torque developed by the device depends upon the reaction of the electromagnet formed by the core 1 and coil 6 upon the magnetic field produced by the current in the bus bar 1, as will be hereinafter more fully explained. As this torque is a function of the ampere-turns produced by the coil 6, it is possible to use the same mechanical design for a number of different protector ratings by using coils 6 of different wire section and number of turns.

A swivel 7 is rotatably mounted in the frame 2 and secured thereto by any suitable fastening means such as a washer 8 and cotter pin 9. The swivel 7 is drilled at 10 to receive a mechanical connection, of any suitable type, for operating the circuit breaker latch.

The operation of the direct-trip element shown in Figs. 1 and 2 may be set forth as follows: The core 1 is normally held in a position parallel to the bus bar 5, as shown, by means of a stop 13a (see Fig. 3) which permits rotation in one direction, for example clockwise, but prevents rotation in the opposite direction. The coil 6 is preferably energized through external impedance elements in such manner as to carry a current proportional to and in phase with the line voltage. The current in the coil 6 acts upon the flux developed by the bus bar 5 to produce a torque of double the line frequency tending to turn the core 1 about the axis of bearing 3 in one direction or the other, depending upon the phase relationship of line voltage and line current. Neglecting saturation effects, this torque is proportional to $EI \cos \theta$, where E is line voltage, I is line current and $\theta$ is the phase angle of line current with reference to voltage.

When the direction of power flow is normal, that is, from the feeder to the network, the torque developed by the core 1 holds it rigidly against the stop 13a. However, if a feeder fault occurs, the direction of power flow reverses, and the core 1 rotates away from its initial position (parallel to the bus bar 5), in the clockwise direction.

As long as the core 1 remains in its initial position, the mutual inductance of the coil 6 and bus bar 5 is zero, so that no currents are induced in the coil 6 by the field of the bus bar, and the current in the coil 6 depends only on line voltage. This relationship is preferably secured by an initial adjustment made by circulating alternating-current through the bus bar 5 with the circuit of potential coil 6 open, and adjusting the initial position of the core 1 until the voltage developed by the coil 6 is zero. In this way, interference with the initial watt response of the device under fault conditions of heavy bus current is prevented.

During a tripping operation, as soon as the core 1 commences to rotate in a clockwise direction, it provides a magnetic path of decreasing reluctance to the magneto-motive force of the bus bar, and the motion tends to progress under the action of the bus bar magnetomotive force alone, to the relative position in which the magnetic reluctance is a minimum. This action results from the tendency of a salient pole armature to turn to the position in which the salient pole passes the maximum number of lines of magnetic flux. In the construction shown, the core 1 tends to rotate to a position at right angles to the bus bar 5.

As the coil 6 interlinks more and more of the flux developed by the bus bar 5, it acts as a short-circuited secondary and develops a component of induced current substantially in phase with the current initially circulating in this coil. It will be seen that these effects tend to produce a highly unstable torque-deflection characteristic of the core 1, so that the latter, once moved from its initial position, rotates into its final position with considerable force.

Figure 3:
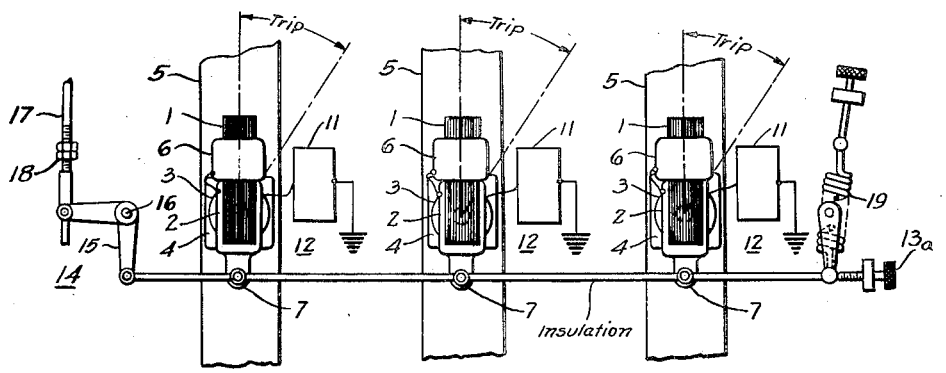
Fig. 3 is a diagrammatic view of three direct-trip elements of the type shown in Fig. 2 mechanically connected for response to polyphase power flow in a three-phase four-wire system.

Fig. 3 shows an arrangement of three direct-trip elements, of the type shown in Figs. 1 and 2, connected together mechanically to respond to the polyphase power flow in a three-phase grounded-neutral network system. In this application, the potential coils 6 may be connected to the bus-bars 5, with or without external impedance elements, in a variety of ways to respond to real power flow, as will be obvious to those skilled in the art. In the connection shown, the potential coils 6 are connected between the corresponding bus bars 5 and ground in series with suitable capacitors 11.

For true watt response, the capacitors 11 should be designed to have reactance equal in value but opposite in sign to the reactance of the coils 6. However, in some installations, it is desirable to provide a slightly rotated tripping characteristic, which may be secured by selecting capacitors 11 of slightly different reactance value from the potential coils 6, so that each potential circuit has a resultant inductive or capacitive reactance, of proper value as compared to the potential circuit resistance, to produce the desired rotation. This expedient is well known in the art and commonly practiced with network relays.

The three direct-trip elements, denoted by the reference numerals 12, are fastened to an insulating rod 13, preferably of phenolic condensation product and having a steel core. An adjustable stop 13a, as mentioned above, is provided for preventing rotation of the elements 12 in the counter-clockwise direction. A bell crank 14, having a vertical arm 15 equal in length to the distance between the axes of the bearing 3 and swivel 7, is rotatably secured to a fixed pivot 16. The bell crank 14 is mechanically connected to the rod 13 and to a trip rod 17, in such manner as to translate the rotary motion of the trip elements 12 to a substantially rectilinear thrust for operating the circuit breaker latch.

A lost motion connection 18, of any suitable construction, is preferably provided for permitting the trip elements 12 and rod 13 to acquire some kinetic momentum before assuming the latch load, during a tripping operation. A reverse power adjustment in the form of an adjustable over-center spring 19 is provided for determining the value of total torque of the elements 12 necessary to start them from their initial position in the tripping direction.

In the Fig. 3 modification, the weight of the parts is made such that the moving system is nearly balanced, but the unbalanced weight acts to center the elements 12 in their initial position and is sufficient to swing the elements 12 from the tripping position past the dead-center position of the spring 19, to the position shown. This arrangement does not permit the adjustment of spring 19 to obtain high reverse-power settings, and for most applications it is desirable to provide a reverse power adjusting device suitable for a wider range of adjustments.

One such device is shown in Fig. 4, in connection with a circuit breaker of the type described in U. S. Patent No. 2,036,284, to Ture Lindstrom, issued April 6, 1936, on an application, Serial No. 744,506, filed Sept. 18, 1934, and assigned to the Westinghouse Electric & Manufacturing Company.

Referring to Fig. 4, in detail, the bus bar 5 and trip element 12 are similar to the corresponding elements described above, except that the trip element 12 is connected to operate in the counter-clockwise direction to trip the circuit breaker, rather than the clockwise direction.

The circuit breaker is denoted as a whole by the reference numeral 20 and comprises an H-shaped main arm 21 secured for rotation about a bearing 23, and having two pins 24 and 25 operated upon by a main toggle 26 and a main spring 27, respectively. The main spring 27 is preferably flat in form and tends to throw the main arm 21 to open position, but is prevented from doing so by the toggle 26. The toggle 26 consists of two pivoted links 26a and 26b, connected between the pin 24 on the main arm 21 and a fixed pivot 28, and designed to latch together in a slightly overcenter position, but to permit opening of the circuit breaker in response to a slight downward pressure at their junction, in a well known manner.

The toggle links 26a and 26b are pivoted together by means of a pin 29 to which is secured a trip rod 30.

The circuit breaker 20 is provided with a main shunt 31 and a main moving contact 32 of well-known construction which are mechanically connected to the main arm 21 by means of any suitable fastening (not shown). It will be understood that the circuit breaker 20 is provided with suitable electromagnetic reclosing mechanism and various auxiliaries, themselves well known in the art, which, for simplicity, have been omitted from the drawings.

The trip rod 30 is provided with a lost motion connection 33 at its lower end, and an offset extension 35 on which is mounted a roller 37. The lost motion connection 33 is disposed to be engaged by a bell crank 38 which is rotatably secured to a fixed pivot 39 for the same purpose as the bell crank 14 of Fig. 3. The bell crank 38 is provided with a staple 40 which serves to maintain the lost motion connection 33 in its proper relative position with reference to the bell crank, although allowing some freedom of movement.

A rotatable carriage plate 42 is mounted on the fixed pivot 39 concentrically with the bell crank 38. The carriage plate 42 is normally held against a stop 43 (see Fig. 5) by means of a strong spring 44, the lower end of which is secured to a fixed auxiliary bumper 45. The auxiliary bumper 45 also serves to limit the angular rotation of the bell crank 38 in the counter-clockwise or tripping direction. An adjustable stop (not shown) similar to the stop 13a of Fig. 3 is provided for preventing clockwise movement of the trip element 12 from its initial position parallel to the bus bar 5.

The carriage plate 42 carries a sliding block 46, which may be adjusted substantially radially with reference to the fixed stop 39 by means of an adjusting bolt 48 rotatably mounted in suitable bearings in the plate 42. A reverse power adjusting spring 50 is secured to the bell crank 38 and sliding block 46 by suitable pins 49, in such manner that it tends to rotate the bell crank 38 in one direction or the other with reference to the plate 42, depending upon the relative position of the line connecting the pins 49 with reference to the fixed pivot 39. A stop 51 is provided on the plate 42 and arranged to limit clockwise rotation of the bell crank 38 to a position slightly past the dead center position of the adjusting spring 50.

The carriage plate 42 is provided with a straight edge 52 which terminates in an arcuate cam surface 53, as best shown in Fig. 5. The trip rod 30 normally hangs from the pin 29 in such a position that the roller 37 engages the straight edge 52.

The cam surface 53 is designed to engage the roller 37, upon downward movement of the trip rod 30, and to hold it upon further downward movement of the trip rod 30 until the carriage plate 42 has rotated from the stop 43 through an angle sufficient to reset the adjusting spring 50, as will be hereinafter more fully explained. This angle is slightly greater than the sum of the angles traversed by the bell crank 38 in moving from its initial position into engagement with the auxiliary bumper 45, and in moving relatively to the plate 42 from a position engaging the stop 51 to the dead center position of the spring 50. Upon rotation of the plate 42 through this entire angle, the cam surface 53 releases the roller 37, and further downward movement of the latter causes it to roll over the rounded toe 54 of the plate 42.

The operation of the apparatus shown in Fig. 4 may be set forth as follows: Upon the occurrence of a reverse power flow exceeding the reverse power adjustment of the device, the trip device 12 rotates in a counter-clockwise direction, and the bell crank 38, after a slight angular movement, engages the lost motion connection 33 and trips the toggle 26. The circuit breaker 20 is accordingly thrown to open position under the action of the main spring 27.

As the circuit breaker 20 moves toward open position, the trip rod 30 is forced downward, and the roller 37 engages the cam surface 53 (see Figs. 5 and 6) and rotates the carriage plate 42 in a counter-clockwise direction.

As the counter-clockwise rotation of the carriage plate 42 continues, the bell crank 38 engages the auxiliary bumper 45 and is held thereby against further rotation. The relative position of the parts at the instant of engagement of the bell crank 38 and the auxiliary bumper 45 is shown in Fig. 6.

As the bell crank 38 is prevented from rotating, further counter-clockwise movement of the carriage plate 42 causes the adjusting spring 50 to be reset. When the deadcenter position of the adjusting spring 50 is reached, the plate 42 is moved further counter-clockwise by the adjusting spring 50 and the stop 51 comes into engagement with the bell crank 38.

Shortly before engagement of the stop 51 with the bell crank 38, the roller 37 disengages the cam surface 53, and further downward movement of the roller 37 causes it to ride over the toe 54 of the carriage plate as mentioned above. The strong spring 44, at this point, causes the carriage plate 42 and bell crank 38 to reset to the position shown in Fig. 5. At the fully open position of the circuit breaker 20, the roller 37 lies slightly below the toe of the carriage plate 42, as shown in Fig. 7.

Upon reclosure of the circuit breaker 20 under action of its automatic reclosing mechanism (not shown), the roller 37 rides up over the toe 54 of the carriage plate 42 into engagement with the straight edge 52. The parts are accordingly all restored to the relative positions shown in Figs. 4 and 5, ready for another operation.

I do not intend that the present invention shall be restricted to the specific structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In a power-directional direct-trip device for use with a bus bar, a movable element of magnetic material mounted for movement from an initial position through a range of positions such that its reluctance to the magneto-motive force of said bus bar decreases with movement from said initial position, and potential coil means for producing a flux component in said movable element at right angle to the line of action of said magnetomotive force when said movable element is in said initial position.

2. In a power-directional direct-trip device for use with a bus bar, a movable element of magnetic material having a salient pole, a mounting for said movable element for restricting movement thereof so that said salient pole moves from an initial position substantially along the line of action of the magnetomotive force of said bus bar, and means for magnetizing said salient pole in accordance with a voltage quantity in a direction substantially at right angles to the line of action of said magnetomotive force when said movable element is in said initial position.

3. In a direct-trip device responsive to a second degree quantity of an electrical circuit, means for producing a magnetomotive force dependent upon a parameter of said quantity and acting along a magnetic path, a movable element of magnetic material mounted in said magnetic path and operable from an initial position through a range of positions such that the derivative of reluctance of said path with respect to deflection of said element is negative in said range, and means for producing a component of magnetization dependent upon the remaining parameter of said quantity and acting upon said movable element at right angles to said magnetic path when said movable element is in said initial position.

4. In a direct-trip device responsive to a second degree quantity of an electrical circuit, means for producing a magnetomotive force dependent upon a parameter of said quantity and acting along a magnetic path, a movable element of magnetic material having a coil thereon energized in accordance with the remaining parameter of said quantity, and a mounting for said movable element for restricting movement thereof with reference to said magnetic path from an initial position through a range of positions such that the mutual inductance of said coil and said first mentioned means is substantially zero in said initial position, and the derivative of reluctance of said magnetic path to deflection of said movable element is negative in said range.

5. In an alternating current system of distribution, a bus bar, a circuit breaker connected to said bus bar, a movable element of magnetic material having a salient pole, a mounting for said movable element for restricting movement thereof so that said salient pole moves from an initial position substantially along the line of action of the magnetomotive force of said bus bar, means for magnetizing said salient pole in accordance with a voltage quantity in a direction crossing the line of action of said magnetomotive force, and latch mechanism for said circuit breaker arranged to be operated by said movable element, said latch mechanism including a lost motion connection effective to permit free acceleration of said movable member to a predetermined extent before assumption of the latch load.

6. In an alternating-current system of distribution, a bus bar, a circuit breaker connected to said bus bar, a movable element of magnetic material mounted for movement from an initial position through a range of positions such that its reluctance to the magneto-motive force of said bus bar decreases with movement from said initial position, potential coil means for producing a flux component acting upon said movable element in a direction crossing the line of action of said magnetomotive force, and latch mechanism for said circuit breaker, said latch mechanism being arranged to be operated by said movable element after free movement thereof through said range without latch load.

7. In an alternating-current system of distribution, a bus bar, a circuit breaker connected to said bus bar, a movable element of magnetic material having a salient pole, means for restricting movement of said movable element to rotation about an axis substantially perpendicular to said bus bar, said salient pole being displaced from said axis for arcuate movement substantially along the line of action of the magnetomotive force of said bus bar, potential coil means for magnetizing said salient pole in accordance with a voltage quantity, and latch mechanism for said circuit breaker arranged to be operated by said movable element, said latch mechanism including a lost motion connection effective to permit free acceleration of said movable element through a predetermined angle before assumption of the latch load.

8. In an alternating-current system of distribution, a bus bar, a circuit breaker connected to said bus bar, an armature mounted for rotation about an axis crossing a portion of the magnetic field developed by said bus bar, potential coil means for producing a component of magnetization acting upon said armature in a direction crossing said axis and said portion of said magnetic field, and latch mechanism for said circuit breaker arranged to be operated by said armature, said latch mechanism including a lost-motion connection effective to permit free acceleration of said armature to a predetermined extent before assumption of the latch load.

9. In an alternating-current system of distribution, an alternating-current circuit, a circuit breaker connected to said circuit, tripping means comprising an armature mounted for rotary movement from an initial position in a tripping direction, and excitation means acting upon said armature, said excitation means being effective to produce quadrature components of magnetization respectively proportional to a voltage condition of said circuit and a current condition of said circuit, said tripping means including means effective upon rotation of said armature from said initial position in said tripping direction for producing a tripping torque component dependent solely upon a current condition of said circuit, and latch mechanism for said circuit breaker arranged to be operated by said armature, said latch mechanism including a lost motion connection effective to permit free acceleration of said armature in said tripping direction under action of said tripping torque component, before assumption of the latch load.

10. In an alternating-current power-directional direct-trip device for use with a bus bar, electromagnetic means inductively associated with said bus bar including an armature of magnetic material mounted for movement from a dead center position through an unstable range of positions to a tripping position, said electromagnetic means being so designed that the forces on said armature resulting from current in said bus bar are substantially balanced when said armature is in said dead-center position but act to produce movement of said armature toward said tripping position when said armature is in said unstable range, voltage coil means effective when said armature is in said dead-center position for producing a component of magnetization acting upon said armature at right angles to a magneto-motive force produced by said bus bar, and a stop for preventing substantial movement of said armature past said dead-center position away from said tripping position.

11. In an alternating-current system of distribution, a bus bar, a circuit breaker connected to said bus bar, electromagnetic means inductively associated with said bus bar including an armature of magnetic material mounted for movement from a dead-center position through an unstable range of positions to a tripping position, said electromagnetic means being designed so that the forces on said armature resulting from current in said bus bar are substantially balanced when said armature is in said dead center position but act to produce movement of said armature toward said tripping position when said armature is in said unstable range, voltage coil means effective when said armature is in said dead-center position for producing a component of magnetization acting upon said armature at right angles to a magneto-motive force produced by current in said bus bar, a stop for preventing substantial movement of said armature past said dead-center position away from said tripping position, and latch mechanism for tripping said circuit breaker, said latch mechanism being arranged to be operated by said armature in said tripping position after free movement of said armature through said unstable range without latch load.

12. In a power-directional direct-trip device for use with a bus bar, a potential magnet of substantially bar form, a potential coil mounted on said potential magnet and secured thereto for movement therewith, and a bearing for said potential magnet having an axis substantially perpendicular to said bus bar.

13. In a power-directional direct-trip device for use with a bus bar, a potential magnet of substantially bar form, a potential coil mounted thereon, and a bearing for said potential magnet mounted directly on said bus bar, said bearing having an axis substantially perpendicular to the bus bar.

14. In an alternating-current system of distribution, a circuit breaker arranged for operating movements to open and closed position, said circuit breaker having a latch, a reverse-power trip device having a movable element biased to an initial position and operable therefrom to trip said latch, energizing means for said device effective to produce an operating force thereof dependent upon a directional function of current and voltage conditions, a reverse power adjusting device for mechanically opposing movement of said movable element in a direction to release said latch when the force developed by said movable element is below a predetermined value, and means responsive to an operating movement of said circuit breaker for releasing said adjusting device to permit resetting of said trip device to said initial position.

15. In an alternating-current system of distribution, a circuit breaker arranged for operating movements to open and closed position, said circuit breaker having a latch, a reverse-power trip device having a movable element biased to an initial position and operable therefrom to trip said latch, energizing means for said device effective to produce an operating force thereof dependent upon a directional function of current and voltage conditions, a spring initially deformed to oppose movement of said movable element from said initial position through a small range of movement and to assist said movable element upon further movement in a direction to trip said latch, and means responsive to an operating movement of said circuit breaker for restoring said spring to its condition of initial deformation.

16. In an alternating-current system of distribution, a circuit breaker arranged for operating movements to open and closed position, said circuit breaker having a latch, a reverse-power trip device having a movable element biased to an initial position and operable therefrom to trip said latch, energizing means for said device effective to produce an operating force thereof dependent upon a directional function of current and voltage conditions, a spring initially deformed to oppose movement of said movable element from said initial position through a small range of movement and to assist said movable element upon further movement in a direction to trip said latch, and means responsive to an operating movement of said circuit breaker to open position for restoring said spring to its condition of initial deformation.

GEORGE O. HARRISON.